(12) United States Patent
Wang et al.

(10) Patent No.: US 10,601,543 B2
(45) Date of Patent: Mar. 24, 2020

(54) CHANNEL STATE INFORMATION REPORTING METHOD AND COMMUNICATIONS APPARATUS

(71) Applicant: HUAWEI TECHNOLOGIES CO., LTD., Shenzhen, Guangdong (CN)

(72) Inventors: Jian Wang, Hangzhou (CN); Huangping Jin, Shanghai (CN); Shengchen Dai, Hangzhou (CN); Rong Li, Hangzhou (CN); Yinggang Du, Shenzhen (CN); Jun Wang, Hangzhou (CN); Yiqun Ge, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/540,086

(22) Filed: Aug. 14, 2019

(65) Prior Publication Data

US 2019/0372704 A1 Dec. 5, 2019

Related U.S. Application Data

(63) Continuation of application No. PCT/CN2019/074539, filed on Feb. 2, 2019.

(30) Foreign Application Priority Data

Feb. 13, 2018 (CN) .......................... 2018 1 0150978
Feb. 27, 2018 (CN) .......................... 2018 1 0162843

(51) Int. Cl.
*H04L 12/28* (2006.01)
*H04L 1/00* (2006.01)
(Continued)

(52) U.S. Cl.
CPC ......... *H04L 1/0008* (2013.01); *H04B 7/0626* (2013.01); *H04B 7/0632* (2013.01); *H04B 7/0639* (2013.01)

(58) Field of Classification Search
CPC .......................... H04L 1/0008; H04B 7/0626
(Continued)

(56) References Cited

U.S. PATENT DOCUMENTS

2015/0146634 A1   5/2015   Hwang et al.
2015/0365925 A1  12/2015   Fu et al.
(Continued)

FOREIGN PATENT DOCUMENTS

CN    103973391 A   8/2014
CN    106330275 A   1/2017
(Continued)

OTHER PUBLICATIONS

3GPP TS 38.212 V15.0.0 (Dec. 2017);3rd Generation Partnership Project;Technical Specification Group Radio Access Network;NR;Multiplexing and channel coding(Release 15);total 82 pages.

*Primary Examiner* — John Pezzlo
(74) *Attorney, Agent, or Firm* — Huawei Technologies Co., Ltd.

(57) ABSTRACT

The application provides manner for communicating channel state information (CSI) in a communication network. A preset length is used for equalizing lengths of CSI to be reported. The preset length is determined based on a quantity of CSI-reference signal (RS) ports. A communication device determines whether a total length of one or more indication information items to be included in the CSI is less than the preset length. If the total length of the one or more indication information items to be included in the CSI is less than the preset length, the communication device adds one or more padding bits, to obtain a CSI bit sequence including the one or more indication information items and the one or more padding bits. A total length of the CSI bit sequence is consistent with the preset length. The communication device then outputs the CSI bit sequence.

20 Claims, 4 Drawing Sheets

(51) Int. Cl.
*H04B 7/06* (2006.01)
*H04J 1/16* (2006.01)

(58) Field of Classification Search
USPC .................................. 370/252, 329, 386
See application file for complete search history.

(56) References Cited

U.S. PATENT DOCUMENTS

| | | |
|---|---|---|
| 2016/0277227 A1 | 9/2016 | Rajakarunanayake |
| 2016/0337105 A1* | 11/2016 | Lawton ................ H04L 1/0026 |
| 2016/0359538 A1 | 12/2016 | Onggosanusi et al. |
| 2018/0159657 A1 | 6/2018 | Yang et al. |

FOREIGN PATENT DOCUMENTS

| | | |
|---|---|---|
| CN | 107078841 A | 8/2017 |
| CN | 107636984 A | 1/2018 |
| EP | 2852075 A1 | 3/2015 |

\* cited by examiner

| CRI | RI | Wideband CQI of a transport block 1 | Subband differential CQI | Indicator of a quantity of non-zero wideband amplitude coefficients | Padding bit |

| CRI | RI | Padding bit | Wideband CQI of a transport block 1 | Subband differential CQI | Indicator of a quantity of non-zero wideband amplitude coefficients |

CHANNEL STATE INFORMATION REPORTING METHOD AND COMMUNICATIONS APPARATUS

CROSS-REFERENCE TO RELATED APPLICATIONS

This application is a continuation of International Patent Application No. PCT/CN2019/074539, filed on Feb. 2, 2019, which claims priority to Chinese Patent Application No. 201810162843.X, filed on Feb. 27, 2018 and Chinese Patent Application No. 201810150978.4, filed on Feb. 13, 2018. The disclosures of the aforementioned patent applications are hereby incorporated by reference in their entireties.

TECHNICAL FIELD

Embodiments of this application relate to the field of communications technologies, and in particular, to a channel state information reporting method and an apparatus.

BACKGROUND

Channel state information (CSI) fed back by a terminal to a network device is a generic term for various types of indication information. For example, the indication information may be channel quality indicator (CQI), precoding matrix indicator (PMI), rank indication (RI), layer indicator (LI), or CSI-reference signal resource indicator (CRI). The CSI reported by the terminal may include one or more types of indication information. Quantity of types of indication information included in the CSI may vary each time, and payload length of the CSI reported by the terminal also varies. The payload length of the CSI may also be referred to as a length of the CSI. The CSI reported by the terminal may be of different reporting types, for example, different ranks, different codebook type configurations, or different quantities of CSI-reference signal (CSI-RS) ports. A length of each type of indication information varies with the reporting type. Therefore, even if the CSI reported by the terminal every time includes a same quantity of types of indication information, lengths of the entire CSI are different.

After receiving the CSI from the terminal, the network device decodes the CSI. If the payload length of the CSI cannot be determined, the network device needs to perform blind detection multiple times. Consequently, decoding efficiency is low, and decoding resource is wasted.

SUMMARY

Embodiments of this application provide an information reporting method, for equalizing lengths of CSI to improve decoding performance of a receive end without affecting encoding performance as much as possible.

The specific technical solutions provided in the embodiments of this application are as follows:

According to a first aspect, an information reporting method is provided. The method is implemented by performing the following steps. A terminal determines whether a length of CSI is less than a preset length, and adds a padding bit to the CSI when determining that the length of the CSI is less than the preset length. A length of CSI obtained by adding the padding bit is consistent with the preset length. The terminal sends the CSI obtained by adding the padding bit. The padding bit is added to the CSI based on the preset length, so that the length of the CSI obtained by adding the padding bit is equal to the preset length. In this way, regardless of when a length of CSI to be actually reported by the terminal is any value less than 25, finally reported CSI can have a uniform length of 25 by adding the padding bit. By obtaining the preset length, a network device does not need to attempt each possible CSI length. Therefore, a quantity of times of blind detection is reduced, and a decoding delay and decoding complexity are reduced.

In a possible design, in a first case, the terminal measures a wide band or a partial band, to obtain a first measurement result of the wide band or the partial band, and uses the first measurement result as the CSI. In this case, the CSI reported by the terminal is a channel state obtained by measuring the wide band or the partial band, and the entire CSI is reported as a whole. In this way, in a manner of reporting CSI as a whole, the entire CSI reported by the terminal can have a uniform length by designing the preset length.

In a possible design, the preset length is a value greater than or equal to 27. For example, in an optional manner, the value of the preset length is 27. In this way, the terminal equalizes CSI with unequal lengths that is obtained in various configuration conditions to 27 bits. After receiving the CSI, the network device can perform decoding based on the preset length of 27 without attempting each possible CSI length. Therefore, a quantity of times of blind detection is reduced, and a decoding delay and decoding complexity are reduced.

In a possible design, in the first case, the terminal determines the preset length based on a configuration condition of the CSI. The configuration condition of the CSI is a codebook type or a quantity of CSI-RS ports. In this way, maximum lengths of various indication information in the CSI can be considered for different configuration conditions, to determine an appropriate preset length.

In a possible design, in the first case, if the configuration condition of the CSI is the quantity of CSI-RS ports, when the quantity of CSI-RS ports is 2, the preset length is 12. When the quantity of CSI-RS ports is 4, the preset length is 16. When the quantity of CSI-RS ports is a value greater than 4, the preset length is 27. All cases are classified into three types based on the quantity of CSI-RS ports, so that a quantity of padding bits added when the quantity of CSI-RS ports is 2 or 4 can be reduced, thereby improving channel encoding performance.

In a possible design, in the first case, if the configuration condition of the CSI is the quantity of CSI-RS ports, when the quantity of CSI-RS ports is 2, the preset length is 10. When the quantity of CSI-RS ports is 4, the preset length is 16. When the quantity of CSI-RS ports is a value greater than 4, the preset length is 27. All cases are classified into three types based on the quantity of CSI-RS ports, so that a quantity of padding bits added when the quantity of CSI-RS ports is 2 or 4 can be reduced, thereby improving channel encoding performance.

In a possible design, in the first case, if the configuration condition of the CSI is the quantity of CSI-RS ports, when the quantity of CSI-RS ports is 2 or 4, the preset length is 16; or when the quantity of CSI-RS ports is a value greater than 4, the preset length is 27. All cases are classified into two types based on the quantity of CSI-RS ports, so that a quantity of padding bits added when the quantity of CSI-RS ports is 2 or 4 can be reduced, thereby improving channel encoding performance.

In a possible design, in the first case, if the configuration condition of the CSI is the codebook type, when the codebook type is type I-multipanel (TypeI-MultiPanel), the preset length is 25; or when the codebook type is type I-single panel (TypeI-SinglePanel), the preset length is 27. All cases are classified into two types based on the codebook type, so that a quantity of padding bits added when the codebook type is TypeI-SinglePanel can be reduced, thereby improving channel encoding performance.

In a possible design, an actual value of the preset length may be alternatively greater than each value of the preset length in the first case in the foregoing possible designs.

In a possible design, in a second case, the terminal measures a wide band and a subband, to obtain a second measurement result of the wide band and the subband, where the second measurement result includes a first part and a second part; and uses the first part as the CSI. In this case, the CSI reported by the terminal is actually a first part (part 1) of channel state information obtained by measuring the wide band and the subband, and the terminal further reports a second part (part 2) of the entire channel state information. Herein, the part 1 needs to have a uniform length, and a length of the part 2 may be obtained based on a decoding result of the part 1. In this way, in a manner of reporting a part 1, a part 1 reported by the terminal can have a uniform length by designing the preset length.

In a possible design, in the second case, the preset length is a value greater than or equal to 50. For example, in an optional manner, the value of the preset length is 50. In this way, the terminal equalizes CSI with unequal lengths that is obtained in various configuration conditions to 27 bits. After receiving the CSI, the network device can perform decoding based on the preset length of 27 without attempting each possible CSI length. Therefore, a quantity of times of blind detection is reduced, and a decoding delay and decoding complexity are reduced.

In a possible design, in the second case, the terminal determines the preset length based on a configuration condition of the CSI. A reporting type of the CSI is at least one of the following: a quantity of CSI-reference signal RS ports, a codebook type, and a quantity of subbands. In this way, maximum lengths of various indication information in the CSI can be considered for different configuration conditions, to determine an appropriate preset length.

In a possible design, in the second case, if the configuration condition of the CSI is the codebook type and the quantity of subbands, when the codebook type is type I-single panel (TypeI-SinglePanel), and the quantity of subbands is L, the preset quantity is (10+2×L), where L is a positive integer, and 3<L<18. Specifically, when the codebook type is TypeI-SinglePanel, and the quantity of subbands is 3, the preset quantity is 16. When the codebook type is TypeI-SinglePanel, and the quantity of subbands is 4, the preset quantity is 18. When the codebook type is TypeI-SinglePanel, and the quantity of subbands is 5, the preset quantity is 20. When the codebook type is TypeI-SinglePanel, and the quantity of subbands is 6, the preset quantity is 22. When the codebook type is TypeI-SinglePanel, and the quantity of subbands is 7, the preset quantity is 24. When the codebook type is TypeI-SinglePanel, and the quantity of subbands is 8, the preset quantity is 26. When the codebook type is TypeI-SinglePanel, and the quantity of subbands is 9, the preset quantity is 28. When the codebook type is TypeI-SinglePanel, and the quantity of subbands is 10, the preset quantity is 30. When the codebook type is TypeI-SinglePanel, and the quantity of subbands is 11, the preset quantity is 32. When the codebook type is TypeI-SinglePanel, and the quantity of subbands is 12, the preset quantity is 34. When the codebook type is TypeI-SinglePanel, and the quantity of subbands is 13, the preset quantity is 36. When the codebook type is TypeI-SinglePanel, and the quantity of subbands is 14, the preset quantity is 38. When the codebook type is TypeI-SinglePanel, and the quantity of subbands is 15, the preset quantity is 40. When the codebook type is TypeI-SinglePanel, and the quantity of subbands is 16, the preset quantity is 42. When the codebook type is TypeI-SinglePanel, and the quantity of subbands is 17, the preset quantity is 44. When the codebook type is TypeI-SinglePanel, and the quantity of subbands is 18, the preset quantity is 46.

Alternatively, when the codebook type is TypeI-MultiPanel, and the quantity of subbands is L, the preset quantity is (9+2×L), where L is a positive integer, and 3<L<18. Specifically, when the codebook type is TypeI-MultiPanel, and the quantity of subbands is 3, the preset quantity is 15. When the codebook type is TypeI-MultiPanel, and the quantity of subbands is 4, the preset quantity is 17. When the codebook type is TypeI-MultiPanel, and the quantity of subbands is 5, the preset quantity is 19. When the codebook type is TypeI-MultiPanel, and the quantity of subbands is 6, the preset quantity is 21. When the codebook type is TypeI-MultiPanel, and the quantity of subbands is 7, the preset quantity is 23. When the codebook type is TypeI-MultiPanel, and the quantity of subbands is 8, the preset quantity is 25. When the codebook type is TypeI-MultiPanel, and the quantity of subbands is 9, the preset quantity is 27. When the codebook type is TypeI-MultiPanel, and the quantity of subbands is 10, the preset quantity is 29. When the codebook type is TypeI-MultiPanel, and the quantity of subbands is 11, the preset quantity is 31. When the codebook type is TypeI-MultiPanel, and the quantity of subbands is 12, the preset quantity is 33. When the codebook type is TypeI-MultiPanel, and the quantity of subbands is 13, the preset quantity is 35. When the codebook type is TypeI-MultiPanel, and the quantity of subbands is 14, the preset quantity is 37. When the codebook type is TypeI-MultiPanel, and the quantity of subbands is 15, the preset quantity is 39. When the codebook type is TypeI-MultiPanel, and the quantity of subbands is 16, the preset quantity is 41. When the codebook type is TypeI-MultiPanel, and the quantity of subbands is 17, the preset quantity is 43. When the codebook type is TypeI-MultiPanel, and the quantity of subbands is 18, the preset quantity is 45.

Alternatively, when the codebook type is TypeII, and the quantity of subbands is L, the preset quantity is (14+2×L), where L is a positive integer, and 3<L<18. Specifically, when the codebook type is TypeII, and the quantity of subbands is 3, the preset quantity is 20. When the codebook type is TypeII, and the quantity of subbands is 4, the preset quantity is 22. When the codebook type is TypeII, and the quantity of subbands is 5, the preset quantity is 24. When the codebook type is TypeII, and the quantity of subbands is 6, the preset quantity is 26. When the codebook type is TypeII, and the quantity of subbands is 7, the preset quantity is 28. When the codebook type is TypeII, and the quantity of subbands is 8, the preset quantity is 30. When the codebook type is TypeII, and the quantity of subbands is 9, the preset quantity is 32. When the codebook type is TypeII, and the quantity of subbands is 10, the preset quantity is 34. When the codebook type is TypeII, and the quantity of subbands is 11, the preset quantity is 36. When the codebook type is TypeII, and the quantity of subbands is 12, the preset quantity is 38. When the codebook type is TypeII, and the quantity of subbands is 13, the preset quantity is 40. When the codebook type is TypeII, and the quantity of subbands is 14, the preset quantity is 42. When the codebook type is TypeII, and the quantity of subbands is 15, the preset quantity is 44. When the codebook type is TypeII, and the quantity of subbands is 16, the preset quantity is 46. When the codebook type is TypeII, and the quantity of subbands is 17, the preset quantity is 48. When the codebook type is TypeII, and the quantity of subbands is 18, the preset quantity is 50.

Finally reported CSI can have the uniform preset length by adding the padding bit. By obtaining the preset length, the network device does not need to attempt each possible CSI length. Therefore, a quantity of times of blind detection is reduced, and a decoding delay and decoding complexity are reduced.

In a possible design, in the second case, if the configuration condition of the CSI is the quantity of CSI-RS ports, when the quantity of CSI-RS ports is 4, the preset length is 48; or when the quantity of CSI-RS ports is a value greater than 4, the preset length is 50. All cases are classified into two types based on the quantity of CSI-RS ports, so that a quantity of padding bits added when the quantity of CSI-RS ports is 2 or 4 can be reduced, thereby improving channel encoding performance.

In a possible design, in the second case, the configuration condition of the CSI may be the codebook type. When the codebook type is type I-multipanel (TypeI-MultiPanel), the preset length is 46. When the codebook type is type I-single panel (TypeI-SinglePanel), the preset length is 45. When the codebook type is type II (TypeII), the preset length is 50, where TypeII includes Type II-port selection (PortSelection). All cases are classified into three types based on the codebook type, so that a quantity of padding bits added when the codebook type is TypeI-SinglePanel can be reduced, thereby improving channel encoding performance.

In a possible design, in the second case, if the configuration condition of the CSI is the quantity L of subbands, the preset length is (14+2×L), where L is a positive integer, and 3<L<18. Specifically, when the quantity of subbands is 3, the preset length is 20. When the quantity of subbands is 4, the preset length is 22. When the quantity of subbands is 5, the preset length is 24. When the quantity of subbands is 6, the preset length is 26. When the quantity of subbands is 7, the preset length is 28. When the quantity of subbands is 8, the preset length is 30. When the quantity of subbands is 9, the preset length is 32. When the quantity of subbands is 10, the preset length is 34. When the quantity of subbands is 11, the preset length is 36. When the quantity of subbands is 12, the preset length is 38. When the quantity of subbands is 13, the preset length is 40. When the quantity of subbands is 14, the preset length is 42 When the quantity of subbands is 15, the preset length is 44; when the quantity of subbands is 16, the preset length is 46; when the quantity of subbands is 17, the preset length is 48. When the quantity of subbands is 18, the preset length is 50. All cases are classified based on the quantity of subbands, so that a quantity of padding bits added when there is a relatively small quantity of subbands can be reduced, thereby improving channel encoding performance.

In a possible design, in the second case, if the configuration condition of the CSI is the quantity of CSI-RS ports and the quantity of subbands, when the quantity of CSI-RS ports is 4, and the quantity of subbands is L, the preset quantity is (12+2×L), where L is a positive integer, and 3<L<18. Specifically, when the quantity of CSI-RS ports is 4, and the quantity of subbands is 3, the preset quantity is 18. When the quantity of CSI-RS ports is 4, and the quantity of subbands is 4, the preset quantity is 20 When the quantity of CSI-RS ports is 4, and the quantity of subbands is 5, the preset quantity is 22. When the quantity of CSI-RS ports is 4, and the quantity of subbands is 6, the preset quantity is 24. When the quantity of CSI-RS ports is 4, and the quantity of subbands is 7, the preset quantity is 26. When the quantity of CSI-RS ports is 4, and the quantity of subbands is 8, the preset quantity is 28. When the quantity of CSI-RS ports is 4, and the quantity of subbands is 9, the preset quantity is 30; when the quantity of CSI-RS ports is 4, and the quantity of subbands is 10, the preset quantity is 32. When the quantity of CSI-RS ports is 4, and the quantity of subbands is 11, the preset quantity is 34. When the quantity of CSI-RS ports is 4, and the quantity of subbands is 12, the preset quantity is 36. When the quantity of CSI-RS ports is 4, and the quantity of subbands is 13, the preset quantity is 38. When the quantity of CSI-RS ports is 4, and the quantity of subbands is 14, the preset quantity is 40. When the quantity of CSI-RS ports is 4, and the quantity of subbands is 15, the preset quantity is 42. When the quantity of CSI-RS ports is 4, and the quantity of subbands is 16, the preset quantity is 44. When the quantity of CSI-RS ports is 4, and the quantity of subbands is 17, the preset quantity is 46. When the quantity of CSI-RS ports is 4, and the quantity of subbands is 18, the preset quantity is 48.

Alternatively, when the quantity of CSI-RS ports is a value greater than 4, and the quantity of subbands is L, the preset quantity is (14+2×L), where L is a positive integer, and 3<L<18. Specifically, when the quantity of CSI-RS ports is a value greater than 4, and the quantity of subbands is 3, the preset quantity is 20. When the quantity of CSI-RS ports is a value greater than 4, and the quantity of subbands is 4, the preset quantity is 22. When the quantity of CSI-RS ports is a value greater than 4, and the quantity of subbands is 5, the preset quantity is 24. When the quantity of CSI-RS ports is a value greater than 4, and the quantity of subbands is 6, the preset quantity is 26. When the quantity of CSI-RS ports is a value greater than 4, and the quantity of subbands is 7, the preset quantity is 28. When the quantity of CSI-RS ports is a value greater than 4, and the quantity of subbands is 8, the preset quantity is 30. When the quantity of CSI-RS ports is a value greater than 4, and the quantity of subbands is 9, the preset quantity is 32. When the quantity of CSI-RS ports is a value greater than 4, and the quantity of subbands is 10, the preset quantity is 34. When the quantity of CSI-RS ports is a value greater than 4, and the quantity of subbands is 11, the preset quantity is 36. When the quantity of CSI-RS ports is a value greater than 4, and the quantity of subbands is 12, the preset quantity is 38. When the quantity of CSI-RS ports is a value greater than 4, and the quantity of subbands is 13, the preset quantity is 40. When the quantity of CSI-RS ports is 4, and the quantity of subbands is 14, the preset quantity is 42. When the quantity of CSI-RS ports is 4, and the quantity of subbands is 15, the preset quantity is 44. When the quantity of CSI-RS ports is 4, and the quantity of subbands is 16, the preset quantity is 46. When the quantity of CSI-RS ports is 4, and the quantity of subbands is 17, the preset quantity is 48. When the quantity of CSI-RS ports is 4, and the quantity of subbands is 18, the preset quantity is 50.

Finally reported CSI can have the uniform preset length by adding the padding bit. By obtaining the preset length, the network device does not need to attempt each possible CSI length. Therefore, a quantity of times of blind detection is reduced, and a decoding delay and decoding complexity are reduced.

In a possible design, in the second case, the padding bit is located after all indication information included in the CSI.

Alternatively, the padding bit is located after a CSI-RS resource indicator CRI and a rank indication RI that are included in the CSI, and is located before indication information included in the CSI except the CRI or the RI. A bit location is designed, so that the network device can perform decoding based on the preset length and the bit location after receiving the CSI, thereby improving decoding performance.

In a possible design, in the second case, the terminal encodes, in a polar code encoding manner, the CSI obtained by adding the padding bit. The padding bit is located at a bit location with lowest reliability in the CSI obtained by adding the padding bit. The bit location is designed, so that the network device can perform decoding based on the preset length and the bit location after receiving the CSI, thereby improving decoding performance. Using the padding bit as a frozen bit can further improve polar code decoding performance.

In a possible design, an actual value of the preset length may be alternatively greater than each value of the preset length in the second case in the foregoing possible designs.

In a possible design, the terminal sends the CSI when determining that the length of the CSI is greater than or equal to the preset length.

In a possible design, the padding bit is 0 or 1.

According to a second aspect, a communications apparatus is provided, and the apparatus has a function of implementing the method according to any one of the first aspect and the possible designs of the first aspect. The function may be implemented by using hardware, or may be implemented by executing corresponding software by hardware. The hardware or the software includes one or more modules corresponding to the function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the first aspect and the possible designs of the first aspect.

In a possible design, the apparatus further includes a transceiver, configured to communicate with a network device.

In a possible design, the apparatus is a terminal.

According to a third aspect, a chip apparatus is provided. The chip apparatus is connected to a memory, or the chip apparatus includes a memory, and is configured to read and execute a software program stored in the memory, to implement the method according to any one of the first aspect and the possible designs of the first aspect.

According to a fourth aspect, a computer storage medium is provided, and stores a computer program, and the computer program includes an instruction used to perform the method according to any one of the first aspect and the possible designs of the first aspect.

According to a fifth aspect, a computer program product that includes an instruction is provided. When the instruction runs on a computer, the computer is enabled to perform the method according to any one of the first aspect and the possible designs of the first aspect.

DESCRIPTION OF EMBODIMENTS

Figure 1:
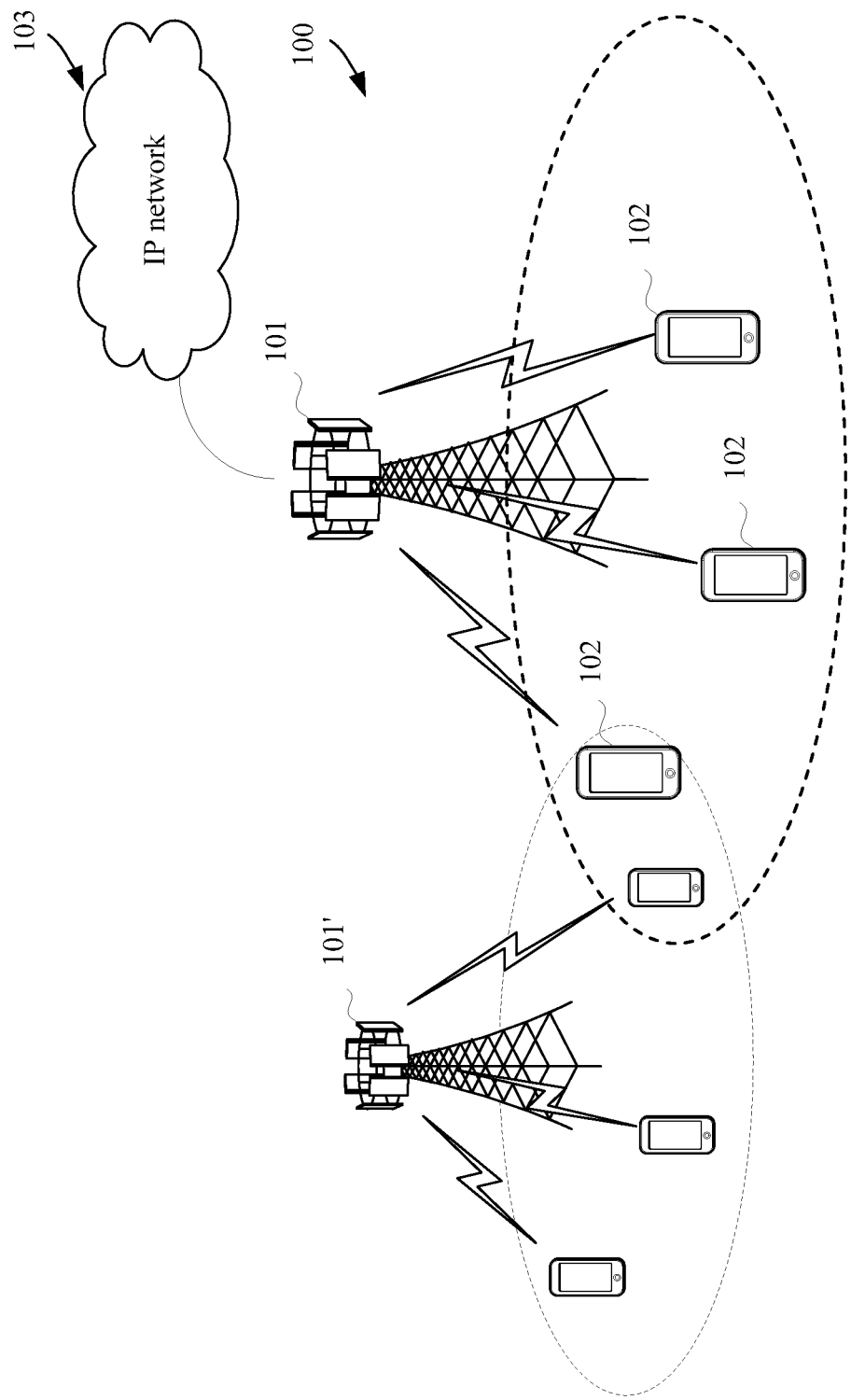
FIG. 1 is a schematic diagram of a communications system in which embodiments of this application may be implemented.

The following describes in detail the embodiments of this application with reference to the accompanying drawings.

This application provides an information reporting method and an apparatus, to provide an implementation solution for equalizing lengths of CSI to improve decoding efficiency and performance. Specifically, in different configuration conditions of CSI, different quantities of padding bits are added to the CSI, so that lengths of sent CSI maintain consistent. This can ensure that a quantity of padding bits is as small as possible, to reduce impact on channel encoding performance. The method and the apparatus are based on a same inventive concept. Because a problem-resolving principle of the method is similar to that of the apparatus, mutual reference may be made to apparatus implementation and method implementation. No repeated description is provided.

Some terms and basic knowledge used in the embodiments of this application are first explained and described, to facilitate understanding of persons skilled in the art.

(1) Wide Band, Partial Band, and Subband

The wide band is a system bandwidth or a carrier bandwidth, and refers to all physical resource blocks (PRBs) used in a system.

A bandwidth of the subband is K consecutive PRBs, and a value of K varies with a value of the system bandwidth. In a 5G system, details are shown in Table 1.

TABLE 1

| Quantity of PRBs included in a system bandwidth | Quantity of PRBs included in a subband |
|---|---|
| <24 | N/A (—) |
| 24-72 | 4 or 8 |
| 73-144 | 8 or 16 |
| 145-275 | 16 or 32 |

A quantity of subbands included in the system bandwidth varies with the system bandwidth and the bandwidth of the subband. The system bandwidth includes a minimum of three subbands and a maximum of 18 subbands. For example, as shown in Table 1, when the system bandwidth includes 24 PRBs and each subband includes eight PRBs, the system bandwidth includes three subbands. When the system bandwidth includes 72 PRBs and each subband includes four PRBs, the system bandwidth includes 18 subbands. When the system bandwidth includes 144 PRBs and each subband includes eight PRBs, the system bandwidth also includes 18 subbands.

The partial band is one or more subbands in the system bandwidth.

(2) Payload Length

The payload length is used to bear specific information, for example, CSI. In this application, for ease of description, the payload length may also be described as a length. For example, a payload length of the CSI is referred to as a length of the CSI.

(3) CSI Reporting Manner

In a 5G system, a terminal may obtain CSI by measuring a wide band or a partial band, or may obtain CSI by measuring a wideband and a subband.

Uplink control information (UCI) that carries the CSI may be transmitted on a physical uplink control channel (PUCCH), or may be transmitted on a physical uplink shared channel (PUSCH). The PUCCH may be classified into a short PUCCH and a long PUCCH based on a quantity of time domain symbols occupied by the PUCCH. The short PUCCH is used to report only the CSI of the wide band or the partial band. The long PUCCH may be used to report the CSI of the wide band or the partial band, and may also be used to report the CSI of the wide band and the subband.

The terminal determines, based on a format indicator (FormatIndicator) of indication information, to report the CSI of the wide band or the partial band, or to report the CSI of the wide band and the subband. For example, when the format indicator of the indication information is PMI-FormatIndicator=widebandPMI and CQI-FormatIndicator=widebandCQI, the long PUCCH is used to report the CSI of the wide band or the partial band. The widebandPMI is used to instruct to report a PMI of the wide band or the partial band, and the widebandCQI is used to instruct to report a CQI of the wide band or the partial band. When the format indicator of the indication information is PMI-FormatIndicator=subbandPMI or CQI-FormatIndicator=subbandCQI, the long PUCCH is used to report the CSI of the wide band and the subband. The subbandPMI is used to instruct to report PMIs of the wide band and the subband, and the subbandCQI is used to instruct to report CQIs of the wide band and the subband. When the long PUCCH is used to report the CSI of the wide band and the subband, the CSI is divided into two parts: a first part (part 1) and a second part (part 2). The part 1 may include parts such as a CRI, an RI, a wideband CQI of a first transport block, a subband differential CQI, and an indicator of a quantity of non-zero wideband amplitude coefficients. The part 2 may include parts such as a wideband CQI of a second transport block, an LI, and a PMI. When the PUSCH is used to report CSI, the CSI is also divided into two parts: a part 1 and a part 2. The part 1 may include parts such as a CRI, an RI, a wideband CQI of a first transport block, a subband differential CQI, an indicator of a quantity of non-zero wideband amplitude coefficients, RSRP, and differential RSRP. The part 2 may include parts such as a wideband CQI of a second transport block, an LI, and a PMI.

The first transport block and the second transport block are transport blocks that are sent at a plurality of layers by using a multiple-antenna technology. When one to four transport layers are used in the system, only one transport block is transmitted. When five to eight transport layers are used in the system, two transport blocks are transmitted. For example, the two transport blocks may be referred to as a first transport block and a second transport block, or may be referred to as a transport block 1 and a transport block 2. A length of indication information, such as the LI and the PMI, included in the part 2 is determined by indication information in the part 1. Therefore, after successfully decoding the part 1, a receive end may decode the part 2 as indicated by content of the part 1. The part 1 and the part 2 may differ in length. After the part 1 is successfully decoded, the length of the part 2 may be determined as indicated by the content of the part 1.

In conclusion, there may be two CSI reporting manners. In a first manner, CSI is reported as a whole. In a second manner, CSI is divided into two parts: a part 1 and a part 2, and the part 1 and the part 2 are separately reported.

When the CSI is reported as a whole, regardless of a length of indication information in each part, consistency of lengths of the entire CSI needs to be ensured. When the part 1 and the part 2 are separately reported, because a length of the part 2 may be determined as indicated by content obtained by decoding the part 1, the terminal needs to ensure that lengths of the part 1 are consistent, to implement successful reception and decoding at the receive end.

(4) Codebook Type

In a 5G system, the codebook type may be type I-multi-panel (TypeI-MultiPanel), type I-single panel (TypeI-SinglePanel), or type II (TypeII). TypeII includes Type II-port selection (PortSelection).

(5) Quantity L of Subbands

In the following description of this application, the quantity of subbands is represented by L. In a 5G system, it is specified in a protocol that a value range of L is [3, 18], L has a minimum value 3 and a maximum value 18, and L is a positive integer.

(6) The term "and/or" describes an association relationship for describing associated objects, and represents that three relationships may exist. For example, A and/or B may represent the following three cases: Only A exists, both A and B exist, and only B exists. The term "or" describes an association relationship for describing associated objects, and represents that two relationships may exist. For example, A or B may represent the following two cases: Only A exists, and only B exists. "A plurality of" refers to two or more. The words such as "first" and "second" are merely used for distinction and description, and shall not be understood as an indication or implication of relative importance or an indication or implication of an order. The character "/" usually indicates an "or" relationship between the associated objects.

Based on the foregoing description, the following describes, in detail with reference to the accompanying drawings, the information reporting method and the apparatus that are provided in the embodiments of this application.

The following describes an architecture of a communications system applicable to the embodiments of this application.

FIG. 1 shows an architecture of a possible communications system applicable to an information reporting method according to an embodiment of this application. As shown in FIG. 1, the communications system 100 includes a network device 101 and one or more terminals 102. When the communications system 100 includes a core network, the network device 101 may be further connected to the core network. The network device 101 may communicate with an IP network 103 through the core network. For example, the IP network 103 may be an internet (Internet), a private IP network, or another data network. The network device 101 provides a service for a terminal 102 within a coverage area. For example, as shown in FIG. 1, the network device 101 provides wireless access for one or more terminals 102 within the coverage area of the network device 101. The communications system 100 may further include a network device 101'. There may be an overlapping area between coverage areas of network devices such as the network device 101 and the network device 101'. The network devices may further communicate with each other. For example, the network device 101 may communicate with the network device 101'.

The network device 101 is a device, in the communications system applied to this application, that connects the terminal 102 to a wireless network. The network device 101 is a node in a radio access network (RAN), and may also be referred to as a base station, or may be referred to as a RAN node (or a device). The network device 101 may be a gNB/NR-NB, a transmission reception point (TRP), an evolved NodeB (eNB), a radio network controller (RNC), a NodeB (Node B, NB), a base station controller (BSC), a base transceiver station (BTS), a home base station (for example, a home evolved NodeB or a home Node B, HNB), a baseband unit (bBBU), a wireless fidelity (Wifi) access point (AP), or a network side device in a 5G communications system or a future possible communications system.

The terminal 102 is also referred to as user equipment (UE), a mobile station (MS), a mobile terminal (MT), or the like, and is a device that provides voice or data connectivity for a user, or may be an internet-of-things device. For example, the terminal 102 includes a handheld device or an in-vehicle device having a wireless connection function. The terminal 102 may be a mobile phone, a tablet computer, a notebook computer, a palmtop computer, a mobile internet device (MID), a wearable device (such as a smartwatch, a smart band, or a pedometer), an in-vehicle device (such as a car, a bicycle, an electric vehicle, an airplane, a ship, a train, or a high-speed train), a virtual reality (VR) device, an augmented reality (AR) device, a wireless terminal in industrial control, a smart home device (such as a refrigerator, a television, an air conditioner, or an electricity meter), an intelligent robot, a workshop device, a wireless terminal in self driving, a wireless terminal in a remote medical surgery, a wireless terminal in a smart grid, a wireless terminal in transportation safety, a wireless terminal in a smart city, a wireless terminal in a smart home, a flight device (such as an intelligent robot, a hot balloon, an unmanned aerial vehicle, or an aircraft), or the like.

In this application, the terminal 102 reports CSI to the network device 101, and the network device 101 receives the CSI reported by the terminal 102.

The communications system shown in FIG. 1 may be a 4th generation (4G) communications system, a 5th generation (5G) communications system, or a future communications system.

Figures 2, 3, 4:
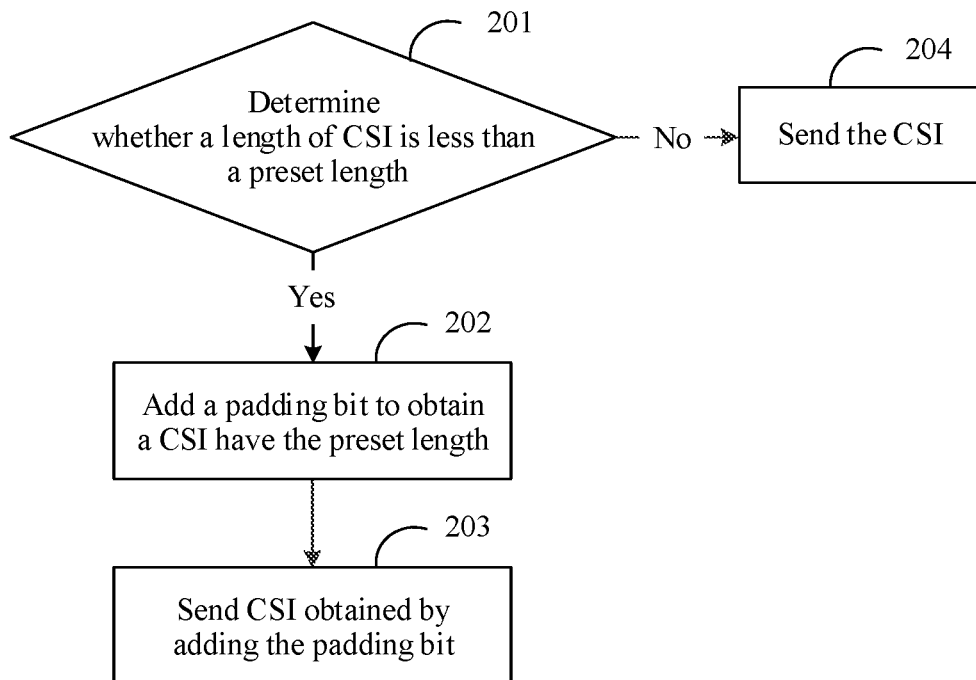
FIG. 2 is a flow diagram of an information reporting method according to an embodiment of this application.
FIG. 3 is a first schematic diagram of a location of a padding bit according to an embodiment of this application.
FIG. 4 is a second schematic diagram of a location of a padding bit according to an embodiment of this application.

Based on the architecture of the communications system shown in FIG. 1, as shown in FIG. 2, the following describes in detail an information reporting method according to an embodiment of this application. The information reporting method may be performed by the terminal 102 in the communications system shown in FIG. 1.

Step 201: The terminal determines whether a length of CSI is less than a preset length, and if yes, step 202 is performed, otherwise, step 204 is performed.

The preset length may be notified by a network device, or the preset length is specified in a protocol.

Optionally, before step 201, the terminal further needs to obtain the CSI. Specifically, the terminal measures a wide band or a partial band, to obtain a first measurement result of the wide band or the partial band. In this case, the CSI in step 201 may be considered as the first measurement result. Alternatively, the terminal measures a wide band and a subband, to obtain a second measurement result of the wide band and the subband, and the second measurement result includes a part 1 and a part 2. In this case, the CSI in step 201 may be considered as the part 1 in the second measurement result.

Step 202: The terminal adds a padding bit to the CSI when determining that the length of the CSI is less than the preset length, where a length of CSI obtained by adding the padding bit is consistent with the preset length.

The padding bit may be fixed to 0, or fixed to 1.

Step 203: The terminal sends the CSI obtained by adding the padding bit.

In actual application, the terminal may encode, in any encoding manner, the CSI obtained by adding the padding bit, for example, in a polar code encoding manner. A payload of the CSI obtained by adding the padding bit is input to a polar code encoder for encoding, and encoded bits are sent.

Step 204: The terminal directly sends the CSI without adding a padding bit to the CSI when determining that the length of the CSI is not less than the preset length.

The following separately describes in detail preset lengths in different cases based on different cases of the CSI that are described in the steps in FIG. 2.

The following describes a first case: The CSI in the foregoing step is the first measurement result.

In the first case, the terminal may determine the preset length based on a configuration condition of the CSI. The configuration condition of the CSI may be a value of a rank, a codebook type (CodebookType), or a quantity of CSI-RS ports, or may be a combination of any several items. A length of each type of indication information in the CSI may vary with the configuration condition of the CSI.

The following describes detailed content of determining the preset length based on the codebook type in the first case.

Table 2 shows, for the codebook type TypeI-SinglePanel, maximum lengths of various indication information and maximum lengths of the reported CSI with all indication information included, corresponding to different ranks and different quantities of CSI-RS ports.

TABLE 2

| Rank and quantity of CSI-RS ports | CRI (bits) | RI (bits) | LI (bits) | PMI (bits) | CQI (bits) | Maximum possible payload length (bits) with all indication information reported |
|---|---|---|---|---|---|---|
| The quantity of CSI-RS ports is equal to 2 | 3 | 1 | 1 | 3 | 4 | 12 |
| The rank is 1, and the quantity of CSI-RS ports is greater than 2 | 3 | 3 | 0 | 10 | 4 | 20 |
| The rank is 2, and the quantity of CSI-RS ports is equal to 4 | 3 | 2 | 1 | 6 | 4 | 16 |
| The rank is 2, and the quantity of CSI-RS ports is greater than 4 | 3 | 3 | 1 | 11 | 4 | 22 |
| The rank is 3/4, and the quantity of CSI-RS ports is equal to 4 | 3 | 2 | 2 | 4 | 4 | 15 |
| The rank is 3/4, and the quantity of CSI-RS ports is greater than 4 | 3 | 3 | 2 | 10 | 4 | 22 |
| The rank is 5/6/7/8 | 3 | 3 | 2 | 9 | 8 | 25 |

For example, it can be seen from Table 2 that when the codebook type is TypeI-SinglePanel, and the quantity of CSI-RS ports is equal to 2, a maximum length of the CRI is 3 bits, a maximum length of the RI is 1 bit, a maximum length of the LI is 1 bit, a maximum length of the PMI is 3 bits, and a maximum length of the CQI is 4 bits. CSI actually reported by the terminal may include some of the foregoing types of indication information, or may include all of the foregoing types of indication information. When the CSI reported by the terminal includes all of the foregoing types of indication information, a maximum possible payload length of the CSI is 12 bits. Similarly, maximum possible payload lengths of CSI for other types in Table 2 are 20, 16, 22, 15, 22, and 25. A largest value 25 is selected from the values. It can be learned that when the codebook type is TypeI-SinglePanel, the maximum possible payload length of the CSI is 25.

When it is determined that the configuration condition of the CSI is the codebook type, and the codebook type is TypeI-SinglePanel, a corresponding preset length is 25.

Table 3 shows, for the codebook type TypeI-MultiPanel, maximum lengths of various indication information and maximum lengths of the reported CSI with all indication information included, corresponding to different ranks.

TABLE 3

| Value of a rank | CRI (bits) | RI (bits) | LI (bits) | PMI (bits) | CQI (bits) | Maximum possible payload length (bits) with all indication information reported |
|---|---|---|---|---|---|---|
| The rank is 1 | 3 | 2 | 0 | 14 | 4 | 23 |
| The rank is 2/3/4 | 3 | 2 | 2 | 16 | 4 | 27 |

For example, it can be seen from Table 3 that when the codebook type is TypeI-MultiPanel, and the rank is equal to 1, a maximum length of the CRI is 3 bits, a maximum length of the RI is 2 bits, a maximum length of the LI is 0 bits, a maximum length of the PMI is 14 bits, and a maximum length of the CQI is 4 bits. CSI actually reported by the terminal may include some of the foregoing types of indication information, or may include all of the foregoing types of indication information. When the CSI reported by the terminal includes all of the foregoing types of indication information, a maximum possible payload length of the CSI is 23 bits. Similarly, it is further shown in Table 3 that when the rank is equal to 2, 3, or 4, a maximum possible payload length of the CSI is 27. A larger value is selected from 23 and 27. It can be learned that when the codebook type is TypeI-MultiPanel, the maximum possible payload length of the CSI is 27.

When it is determined that the configuration condition of the CSI is the codebook type, and the codebook type is TypeI-MultiPanel, a corresponding preset length is 27.

In conclusion, when it is determined that the configuration condition of the CSI is the codebook type, the terminal determines the preset length based on the codebook type. A correspondence between a codebook type and a preset length may be shown in Table 4.

TABLE 4

| Codebook type | Preset length (bits) |
|---|---|
| TypeI-SinglePanel | 25 |
| TypeI-MultiPanel | 27 |

As shown in Table 4, when the codebook type is TypeI-SinglePanel, the preset length is 25. In step 201, the terminal adds the padding bit to the CSI when determining that the length of the CSI is less than 25, so that the length of the CSI obtained by adding the padding bit is 25, and the CSI having the length of 25 is sent. In this way, regardless of when a length of CSI to be actually reported by the terminal is any value less than 25, finally reported CSI can have a uniform length of 25 by adding the padding bit. When the codebook type is TypeI-MultiPanel, the preset length is 27. In step 201, the terminal adds the padding bit to the CSI when determining that the length of the CSI is less than 27, so that the length of the CSI obtained by adding the padding bit is 27, and the CSI having the length of 27 is sent. In this way, regardless of when a length of CSI to be actually reported by the terminal is any value less than 27, finally reported CSI can have a uniform length of 27 by adding the padding bit.

All cases are classified based on the two codebook types, so that a quantity of padding bits added when the codebook type is TypeI-SinglePanel can be reduced, thereby improving channel encoding performance.

The following describes, in the first case, a preset length corresponding to a case in which the configuration condition of the CSI is the quantity of CSI-RS ports.

The quantity of CSI-RS ports may be a value such as 2, 4, or 8. A maximum length of each type of indication information in the CSI varies with the quantity of CSI-RS ports. As shown in Table 5, for the quantity of CSI-RS ports, there are three cases: The quantity of CSI-RS ports is 2, the quantity of CSI-RS ports is 4, and the quantity of CSI-RS ports is a value greater than 4. Table 5 shows, for the three cases of the quantity of CSI-RS ports, maximum lengths of various indication information and maximum lengths of the reported CSI (namely, maximum possible payload lengths of the CSI) with all indication information included.

TABLE 5

| Quantity of CSI-RS ports | CRI (bits) | RI (bits) | LI (bits) | PMI (bits) | CQI (bits) | Maximum possible payload length (bits) with all indication information reported |
|---|---|---|---|---|---|---|
| 2 | 3 | 1 | 1 | 3 | 4 | 12 |
| 4 | 3 | 2 | 1 | 6 | 4 | 16 |
| >4 | 3 | 2 | 2 | 16 | 4 | 27 |

For example, it can be seen from Table 5 that when the quantity of CSI-RS ports is 2, a maximum possible payload length of CSI is 12 bits. In this case, a length of the CRI is 3 bits, a length of the RI is 1 bit, a length of the LI is 1 bit, a length of the PMI is 3 bits, and a length of the CQI is 4 bits. CSI actually reported by the terminal may include some of the foregoing types of indication information, or may include all of the foregoing types of indication information. When the CSI reported by the terminal includes all of the foregoing types of indication information, a maximum possible payload length of the CSI is 12 bits.

When the quantity of CSI-RS ports is 4, a maximum possible payload length of CSI is 16 bits. In this case, a length of the CRI is 3 bits, a length of the RI is 2 bits, a length of the LI is 1 bit, a length of the PMI is 6 bits, and a length of the CQI is 4 bits. When the CSI reported by the terminal includes all of the foregoing types of indication information, a maximum possible payload length of the CSI is 16 bits.

When the quantity of CSI-RS ports is a value greater than 4, a maximum possible payload length of CSI is 27 bits. In this case, a length of the CRI is 3 bits, a length of the RI is 2 bits, a length of the LI is 2 bits, a length of the PMI is 16 bits, and a length of the CQI is 4 bits. When the CSI reported by the terminal includes all of the foregoing types of indication information, a maximum possible payload length of the CSI is 27 bits.

In conclusion, when it is determined that the configuration condition of the CSI is the quantity of CSI-RS ports, the terminal determines the preset length based on the quantity of CSI-RS ports. A correspondence between a quantity of CSI-RS ports and a preset length may be shown in Table 6.

TABLE 6

| Quantity of CSI-RS ports | Preset length (bits) |
|---|---|
| 2 | 12 |
| 4 | 16 |
| >4 | 27 |

When the quantity of CSI-RS ports is 2, the corresponding preset length is 12 bits. In step 201, the terminal adds the padding bit to the CSI when determining that the length of the CSI is less than 12, so that the length of the CSI obtained by adding the padding bit is 12, and the CSI having the length of 12 is sent. In this way, regardless of when a length of CSI to be actually reported by the terminal is any value less than 12, finally reported CSI can have a uniform length of 12 by adding the padding bit.

When the quantity of CSI-RS ports is 4, the corresponding preset length is 16 bits. Similarly, in step 201, the terminal adds the padding bit to the CSI when determining that the length of the CSI is less than 16, so that the length of the CSI obtained by adding the padding bit is 16, and the CSI having the length of 16 is sent. In this way, regardless of when a length of CSI to be actually reported by the terminal is any value less than 16, finally reported CSI can have a uniform length of 16 by adding the padding bit.

When the quantity of CSI-RS ports is a value greater than 4, the corresponding preset length is 27 bits. In step 201, the terminal adds the padding bit to the CSI when determining that the length of the CSI is less than 27, so that the length of the CSI obtained by adding the padding bit is 27, and the CSI having the length of 27 is sent. In this way, regardless of when a length of CSI to be actually reported by the terminal is any value less than 27, finally reported CSI can have a uniform length of 27 by adding the padding bit.

All cases are classified based on the quantity of CSI-RS ports, so that a quantity of padding bits added when the quantity of CSI-RS ports is 2 or 4 can be reduced, thereby improving channel encoding performance.

The following describes, in the first case, another preset length corresponding to a case in which the configuration condition of the CSI is the quantity of CSI-RS ports.

The quantity of CSI-RS ports may be a value such as 2, 4, or 8. A maximum length of each type of indication information in the CSI varies with the quantity of CSI-RS ports. As shown in Table 7, for the quantity of CSI-RS ports, there are three cases: The quantity of CSI-RS ports is 2, the quantity of CSI-RS ports is 4, and the quantity of CSI-RS ports is a value greater than 4. Table 7 shows, for the three cases of the quantity of CSI-RS ports, maximum lengths of various indication information and maximum lengths of the reported CSI (namely, maximum possible payload lengths of the CSI) with all indication information included.

TABLE 7

| Quantity of CSI-RS ports | CRI (bits) | RI (bits) | LI (bits) | PMI (bits) | CQI (bits) | Maximum possible payload length (bits) with all indication information reported |
|---|---|---|---|---|---|---|
| 2 | 3 | 1 | 1 | 1 | 4 | 10 |
| 4 | 3 | 2 | 1 | 6 | 4 | 16 |
| >4 | 3 | 2 | 2 | 16 | 4 | 27 |

For example, it can be seen from Table 7 that when the quantity of CSI-RS ports is 2, a maximum possible payload length of CSI is 10 bits. In this case, a length of the CRI is 3 bits, a length of the RI is 1 bit, a length of the LI is 1 bit, a length of the PMI is 1 bit, and a length of the CQI is 4 bits. CSI actually reported by the terminal may include some of the foregoing types of indication information, or may include all of the foregoing types of indication information. When the CSI reported by the terminal includes all of the foregoing types of indication information, a maximum possible payload length of the CSI is 10 bits.

When the quantity of CSI-RS ports is 4, a maximum possible payload length of CSI is 16 bits. In this case, a length of the CRI is 3 bits, a length of the RI is 2 bits, a length of the LI is 1 bit, a length of the PMI is 6 bits, and a length of the CQI is 4 bits. When the CSI reported by the terminal includes all of the foregoing types of indication information, a maximum possible payload length of the CSI is 16 bits.

When the quantity of CSI-RS ports is a value greater than 4, a maximum possible payload length of CSI is 27 bits. In this case, a length of the CRI is 3 bits, a length of the RI is 2 bits, a length of the LI is 2 bits, a length of the PMI is 16 bits, and a length of the CQI is 4 bits. When the CSI reported by the terminal includes all of the foregoing types of indication information, a maximum possible payload length of the CSI is 27 bits.

In conclusion, when it is determined that the configuration condition of the CSI is the quantity of CSI-RS ports, the terminal determines the preset length based on the quantity of CSI-RS ports. A correspondence between a quantity of CSI-RS ports and a preset length may be shown in Table 8.

TABLE 8

| Quantity of CSI-RS ports | Preset length (bits) |
|---|---|
| 2 | 10 |
| 4 | 16 |
| >4 | 27 |

When the quantity of CSI-RS ports is 2, the corresponding preset length is 10 bits. In step 201, the terminal adds the padding bit to the CSI when determining that the length of the CSI is less than 10, so that the length of the CSI obtained by adding the padding bit is 10, and the CSI having the length of 10 is sent. In this way, regardless of when a length of CSI to be actually reported by the terminal is any value less than 10, finally reported CSI can have a uniform length of 10 by adding the padding bit.

When the quantity of CSI-RS ports is 4, the corresponding preset length is 16 bits. Similarly, in step 201, the terminal adds the padding bit to the CSI when determining that the length of the CSI is less than 16, so that the length of the CSI obtained by adding the padding bit is 16, and the CSI having the length of 16 is sent. In this way, regardless of when a length of CSI to be actually reported by the terminal is any value less than 16, finally reported CSI can have a uniform length of 16 by adding the padding bit.

When the quantity of CSI-RS ports is a value greater than 4, the corresponding preset length is 27 bits. In step 201, the terminal adds the padding bit to the CSI when determining that the length of the CSI is less than 27, so that the length of the CSI obtained by adding the padding bit is 27, and the CSI having the length of 27 is sent. In this way, regardless of when a length of CSI to be actually reported by the terminal is any value less than 27, finally reported CSI can have a uniform length of 27 by adding the padding bit.

All cases are classified based on the quantity of CSI-RS ports, so that a quantity of padding bits added when the quantity of CSI-RS ports is 2 or 4 can be reduced, thereby improving channel encoding performance.

Based on Table 5 or Table 6, in another possible implementation, as shown in Table 9, when the quantity of CSI-RS ports is 2 or 4, the corresponding preset length is 16, and when the quantity of CSI-RS ports is a value greater than 4, the corresponding preset length is 27 bits.

TABLE 9

| Quantity of CSI-RS ports | Preset length (bits) |
|---|---|
| 2 or 4 | 16 |
| >4 | 27 |

All cases are classified based on the quantity of CSI-RS ports, so that a quantity of padding bits added when the quantity of CSI-RS ports is 2 or 4 can be reduced, thereby improving channel encoding performance.

It can be seen from Table 4 and Table 6 (or Table 9) that in the first case, when a plurality of configuration conditions such as the codebook type, the value of the rank, and the quantity of CSI-RS ports are considered, the maximum possible payload length is 27 when all the indication information included in the CSI are reported. Based on this, in another possible design, the preset length is set to M, where M is a number greater than or equal to 27. In step 201, the terminal adds the padding bit to the CSI when determining that the length of the CSI is less than M, so that the length of the CSI obtained by adding the padding bit is M, and the CSI having the length of M is sent. In this way, regardless of when a length of CSI to be actually reported by the terminal is any value less than M, finally reported CSI can have a uniform length of M by adding the padding bit. To reduce redundant bits, M may be fixed to 27.

Description of preset lengths corresponding to various configuration conditions of the CSI in the first case is completed. In addition, the terminal may add the padding bit to the CSI at a location between any two types of indication information. In the first case, indication information included in the CSI may include a CRI, an RI, an LI, a PMI, and a CQI. Optionally, the terminal adds the padding bit at a location that is after the CRI and the RI and that is before the PMI and the CQI.

The following describes a second case: The CSI in the foregoing step is the part 1.

In the second case, the terminal may determine the preset length based on a configuration condition of the CSI. The configuration condition of the CSI may be a quantity of subbands, a codebook type, or a quantity of CSI-RS ports, or may be a combination of any several items. A length of each type of indication information in the CSI may vary with the configuration condition of the CSI. Indication information included in the CSI may include but is not limited to one or more of the following: a CRI, an RI, a wideband CQI of the first transport block, a subband differential CQI, and an indicator of a quantity of non-zero wideband amplitude coefficients.

1. The Preset Length is Determined Based on the Quantity of Subbands.

The quantity of subbands may be represented by L, and a value range of L is [3, 18]. In other words, L has a minimum value 3 and a maximum value 18, and L is a positive integer.

A length of the subband differential CQI varies with the quantity of subbands, and therefore, a length of the part 1 varies. For a same quantity of subbands, a length of the RI varies with a configuration. A maximum possible length of the part 1 is obtained when the codebook type is TypeII (including TypeII-PortSelection) and the quantity of CSI-RS ports is greater than 4.

Table 10 shows, for the codebook type TypeII (including TypeII-PortSelection), maximum lengths of various indication information and maximum lengths of the CSI with all indication information included in the reported part 1, corresponding to different quantities of subbands obtained when the quantity of CSI-RS ports greater than 4.

TABLE 10

| Quantity of subbands | CRI (bits) | RI (bits) | Wideband CQI (bits) of the first transport block | Subband differential CQI (bits) | Indicator (bits) of a quantity of non-zero wideband amplitude coefficients | Maximum payload length (bits) with all indication information reported |
|---|---|---|---|---|---|---|
| 3 | 3 | 1 | 4 | 6 | 6 | 20 |
| 4 | 3 | 1 | 4 | 8 | 6 | 22 |
| 5 | 3 | 1 | 4 | 10 | 6 | 24 |
| 6 | 3 | 1 | 4 | 12 | 6 | 26 |
| 7 | 3 | 1 | 4 | 14 | 6 | 28 |
| 8 | 3 | 1 | 4 | 16 | 6 | 30 |
| 9 | 3 | 1 | 4 | 18 | 6 | 32 |
| 10 | 3 | 1 | 4 | 20 | 6 | 34 |
| 11 | 3 | 1 | 4 | 22 | 6 | 36 |
| 12 | 3 | 1 | 4 | 24 | 6 | 38 |
| 13 | 3 | 1 | 4 | 26 | 6 | 40 |
| 14 | 3 | 1 | 4 | 28 | 6 | 42 |
| 15 | 3 | 1 | 4 | 30 | 6 | 44 |
| 16 | 3 | 1 | 4 | 32 | 6 | 46 |
| 17 | 3 | 1 | 4 | 34 | 6 | 48 |
| 18 | 3 | 1 | 4 | 36 | 6 | 50 |

It can be seen from Table 10 that when the quantity of subbands is 3, a maximum length of the CRI is 3 bits, a maximum length of the RI is 1, a maximum length of the wideband CQI of the first transport block is 4, a maximum length of the subband differential CQI is 6, and a maximum length of the indicator of the quantity of non-zero wideband amplitude coefficients is 6. When the CSI reported by the terminal includes all of the foregoing types of indication information, a maximum possible payload length of the CSI is 20 bits. Similarly, when quantities of subbands are 4, 5, 6, . . . , and 18, maximum possible payload lengths of CSI are 22, 24, 26, . . . and 50.

In conclusion, when the preset length is determined based on the quantity of subbands, a correspondence between a quantity of subbands and a preset length may be shown in Table 11.

TABLE 11

| Quantity of subbands | Preset length (bits) |
| --- | --- |
| 3 | 20 |
| 4 | 22 |
| 5 | 24 |
| 6 | 26 |
| 7 | 28 |
| 8 | 30 |
| 9 | 32 |
| 10 | 34 |
| 11 | 36 |
| 12 | 38 |
| 13 | 40 |
| 14 | 42 |
| 15 | 44 |
| 16 | 46 |
| 17 | 48 |
| 18 | 50 |

A relationship between the preset length and the quantity L of subbands is that the preset length is $(14+2\times L)$, where a value range of L is [3, 18].

All cases are classified based on the quantity of subbands, so that a quantity of padding bits added when there is a relatively small quantity of subbands can be reduced, thereby improving channel encoding performance.

2. The Preset Length is Determined Based on the Quantity of CSI-RS Ports.

For the quantity of CSI-RS ports, there are two cases: The quantity of CSI-RS ports is 4, and the quantity of CSI-RS ports is greater than 4. In each value case of the quantity of CSI-RS ports, a maximum length of each type of indication information varies with a configuration parameter such as the codebook type.

Table 12 shows maximum lengths of various indication information and maximum lengths of the CSI with all indication information included in the reported part 1.

TABLE 12

| Quantity of CSI-RS ports | CRI (bits) | RI (bits) | Wideband CQI (bits) of the first transport block | Subband differential CQI (bits) | Indicator (bits) of a quantity of non-zero wideband amplitude coefficients | Maximum payload length (bits) with all indication information reported |
| --- | --- | --- | --- | --- | --- | --- |
| 4 | 3 | 1 | 4 | 2 × L | 4 | 12 + 2 × L |
| >4 | 3 | 1 | 4 | 2 × L | 6 | 14 + 2 × L |

In Table 12, L is the quantity of subbands. According to a value of L specified in a protocol, a maximum value of L is 18. When the value of L is 18, the maximum possible payload length of CSI that is represented in the last column in Table 12 is a maximum value. Specifically, as shown in Table 13, when the quantity of CSI-RS ports is 4, the preset length is $(12+2\times 18)=48$; and when the quantity of CSI-RS ports is a value greater than 4, the preset length is $(14+2\times 18)=50$.

TABLE 13

| Quantity of CSI-RS ports | Preset length (bits) |
| --- | --- |
| 4 | 48 |
| >4 | 50 |

All cases are classified based on the quantity of CSI-RS ports, so that a quantity of padding bits added when the quantity of CSI-RS ports is 4 can be reduced, thereby improving channel encoding performance.

3. The Preset Length is Determined Based on the Codebook Type.

As described in term explanation, three possible codebook types are TypeI-SinglePanel, TypeI-MultiPanel, and TypeII. Table 14 shows, for each codebook type, maximum lengths of various indication information and maximum possible payload lengths with all indication information in the CSI reported, in consideration of a plurality of configuration conditions such as a value of a rank and the quantity of CSI-RS ports.

TABLE 14

| Codebook type | CRI (bits) | RI (bits) | Wideband CQI (bits) of the first transport block | Subband differential CQI (bits) | Indicator (bits) of a quantity of non-zero wideband amplitude coefficients | Maximum payload length (bits) with all indication information reported |
| --- | --- | --- | --- | --- | --- | --- |
| TypeI-SinglePanel | 3 | 3 | 4 | 2 × L | 0 | 10 + 2 × L |
| TypeI-MultiPanel | 3 | 2 | 4 | 2 × L | 0 | 9 + 2 × L |
| TypeII (including TypeII-PortSelection) | 3 | 1 | 4 | 2 × L | 6 | 14 + 2 × L |

In Table 14, L is the quantity of subbands. According to a value of L specified in a protocol, a maximum value of L is 18. When the value of L is 18, the maximum possible payload length of CSI that is represented in the last column in Table 14 is a maximum value. Specifically, as shown in Table 15, when the codebook type is TypeI-SinglePanel, the preset length is (10+2×18)=46; when the codebook type is TypeI-MultiPanel, the preset length is (9+2×18)=45; and when the codebook type is TypeII, the preset length is (14+2×18)=50.

TABLE 15

| Codebook type | Preset length (bits) |
|---|---|
| TypeI-SinglePanel | 46 |
| TypeI-MultiPanel | 45 |
| TypeII (including TypeII-PortSelection) | 50 |

All cases are classified based on the three codebook types, so that a quantity of padding bits added when the codebook type is TypeI-SinglePanel can be reduced, thereby improving channel encoding performance.

4. The Preset Length is Determined Based on the Quantity of Subbands and the Codebook Type.

Specifically, from the sense of codebook types, maximum possible payload lengths of CSI with different configuration conditions are considered may be first determined for each codebook type. Then for each codebook type, a plurality of subtypes are obtained through division based on different quantities of subbands, and preset lengths corresponding to the different quantities of subbands are obtained.

As shown in Table 16, the following are listed separately: corresponding preset lengths obtained when the codebook type is TypeI-SinglePanel and quantities of subbands are 3 to 18, corresponding preset lengths obtained when the codebook type is TypeI-MultiPanel and quantities of subbands are 3 to 18, and corresponding preset lengths obtained when the codebook type is TypeII and quantities of subbands are 3 to 18.

TABLE 16

| Codebook type | Quantity of subbands | Preset length (bits) |
|---|---|---|
| TypeI-SinglePanel | 3 | 16 |
| | 4 | 18 |
| | 5 | 20 |
| | 6 | 22 |
| | 7 | 24 |
| | 8 | 26 |
| | 9 | 28 |
| | 10 | 30 |
| | 11 | 32 |
| | 12 | 34 |
| | 13 | 36 |
| | 14 | 38 |
| | 15 | 40 |
| | 16 | 42 |
| | 17 | 44 |
| | 18 | 46 |
| TypeI-MultiPanel | 3 | 15 |
| | 4 | 17 |
| | 5 | 19 |
| | 6 | 21 |
| | 7 | 23 |
| | 8 | 25 |
| | 9 | 27 |
| | 10 | 29 |
| | 11 | 31 |
| | 12 | 33 |
| | 13 | 35 |
| | 14 | 37 |
| | 15 | 39 |
| | 16 | 41 |
| | 17 | 43 |
| | 18 | 45 |
| TypeII (including TypeII-PortSelection) | 3 | 20 |
| | 4 | 22 |
| | 5 | 24 |
| | 6 | 26 |
| | 7 | 28 |
| | 8 | 30 |
| | 9 | 32 |
| | 10 | 34 |
| | 11 | 36 |
| | 12 | 38 |
| | 13 | 40 |
| | 14 | 42 |
| | 15 | 44 |
| | 16 | 46 |
| | 17 | 48 |
| | 18 | 50 |

Certainly, alternatively, from the sense of quantities of subbands, maximum possible payload lengths of CSI with different configuration conditions considered may be first determined for each quantity of subbands. Then for each quantity of subbands, a plurality of subtypes are obtained through division based on different codebook types, and preset lengths corresponding to the different codebook types are obtained. A representation form of a table with results obtained in this determining manner is different from that in Table 16, but content in both tables is consistent. In other words, the preset lengths corresponding to the quantity of subbands and the codebook type are consistent.

5. The Preset Length is Determined Based on the Quantity of Subbands and the Quantity of CSI-RS Ports.

Specifically, from the sense of quantities of CSI-RS ports, maximum possible payload lengths of CSI with different configurations considered may be first determined for each quantity of CSI-RS ports. Then for each quantity of CSI-RS ports, a plurality of subtypes are obtained through division based on different quantities of subbands, and preset lengths corresponding to the different quantities of subbands are obtained.

As shown in Table 17, the following are listed separately: corresponding preset lengths obtained when the quantity of CSI-RS ports is 4 and quantities of subbands are 3 to 18, and corresponding preset lengths obtained when the quantity of CSI-RS ports is greater than 4 and the quantities of subbands are 3 to 18.

TABLE 17

| Quantity of CSI-RS ports | Quantity of subbands | Preset length (bits) |
|---|---|---|
| 4 | 3 | 18 |
| | 4 | 20 |
| | 5 | 22 |
| | 6 | 24 |
| | 7 | 26 |
| | 8 | 28 |
| | 9 | 30 |
| | 10 | 32 |
| | 11 | 34 |
| | 12 | 36 |
| | 13 | 38 |
| | 14 | 40 |
| | 15 | 42 |
| | 16 | 44 |
| | 17 | 46 |

TABLE 17-continued

| Quantity of CSI-RS ports | Quantity of subbands | Preset length (bits) |
|---|---|---|
|  | 18 | 48 |
| >4 | 3 | 20 |
|  | 4 | 22 |
|  | 5 | 24 |
|  | 6 | 26 |
|  | 7 | 28 |
|  | 8 | 30 |
|  | 9 | 32 |
|  | 10 | 34 |
|  | 11 | 36 |
|  | 12 | 38 |
|  | 13 | 40 |
|  | 14 | 42 |
|  | 15 | 44 |
|  | 16 | 46 |
|  | 17 | 48 |
|  | 18 | 50 |

Certainly, alternatively, from the sense of quantities of subbands, maximum possible payload lengths of CSI with different configuration conditions considered may be first determined for each quantity of subbands. Then for each quantity of subbands, a plurality of subtypes are obtained through division based on different quantities of CSI-RS ports, and preset lengths corresponding to the different quantities of CSI-RS ports are obtained. A representation form of a table with results obtained in this determining manner is different from that in Table 17, but content in both tables is consistent. In other words, the preset lengths corresponding to the quantity of subbands and the quantity of CSI-RS ports are consistent.

It can be seen from Table 11, Table 13, Table 15, Table 16, and Table 17 that in the second case, when a plurality of configuration conditions such as the codebook type, the value of the rank, and the quantity of CSI-RS ports are considered, the maximum possible payload length with all indication information in the CSI reported is (14+2×L), where a maximum value of L is 18. Therefore, a maximum value of the preset length is (14+2×18)=50. Based on this, in another possible design, in the second case, the preset length is set to N, where N is a number greater than or equal to 50. In step 201, the terminal adds the padding bit to the CSI when determining that the length of the CSI is less than N, so that the length of the CSI obtained by adding the padding bit is N, and the CSI having the length of N is sent. Finally reported CSI has a uniform length of N by adding the padding bit. To reduce redundant bits, N may be fixed to 50.

Figure 5:
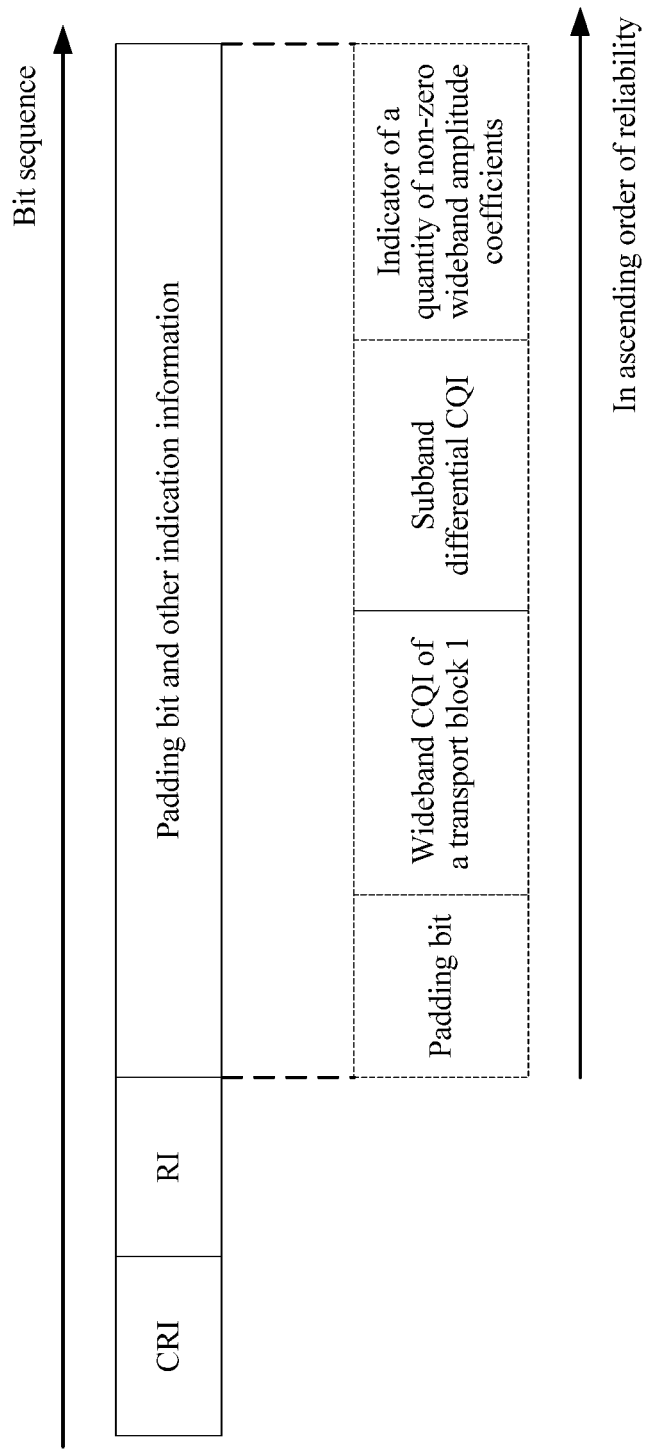
FIG. 5 is a third schematic diagram of a location of a padding bit according to an embodiment of this application.

Description of preset lengths corresponding to various configuration conditions of the CSI in the second case is completed. In addition, the terminal may add the padding bit to the CSI at a location between any two types of indication information. In the second case, the indication information included in the CSI may include the CRI, the RI, the wideband CQI of the first transport block (namely, a wideband CQI of a transport block 1), the subband differential CQI, and the indicator of the quantity of non-zero wideband amplitude coefficients. As shown in FIG. 3, in a possible implementation, the terminal adds the padding bit at a location after all the indication information. As shown in FIG. 4, in another possible implementation, the terminal adds the padding bit at a location that is after the CRI and the RI and that is before the wideband CQI of the transport block 1. As shown in FIG. 5, if the CSI obtained by adding the padding bit is encoded in a polar code encoding manner, in another possible implementation, the terminal adds the padding bit at a location with lowest reliability, for example, adding the padding bit at a location with lowest reliability that is after the CRI and the RI. The padding bit may be used as a frozen bit. As a receive end, after receiving CSI data, the network device first obtains the CRI and the RI through decoding. A length of indication information other than the CRI and the RI may be calculated by using signaling. A length of the padding bit may be obtained by sequentially subtracting lengths of the CRI and the RI and the length of the indication information other than the CRI and the RI from the preset length. Using the padding bit as the frozen bit can further improve polar code decoding performance.

So far, description of preset lengths corresponding to different configuration conditions of the CSI in the first case and the second case has been completed. The following provides comprehensive descriptions for the first case and the second case.

It should be noted that the value of the preset length shown in any of the foregoing tables is an example. In actual application, the preset length may be greater than the value of the preset length shown in the table. However, a larger value of the preset length indicates a larger quantity of padding bits and more added redundant bits. To reduce impact on channel encoding performance, the value of the preset length shown in the foregoing tables may be selected.

The terminal determines some configuration conditions of the reported CSI, namely, a specific case and a specific configuration condition of the CSI, and determines a corresponding preset length based on the configuration condition, for example, the first case or the second case, and a specific configuration condition of the CSI in the first case. For example, the configuration condition of the CSI is the quantity of CSI-RS ports. In this case, preset lengths corresponding to different quantities of CSI-RS ports in the first case need to be determined. In this application, all cases of designed preset lengths are classified. This can ensure that a possible quantity of added padding bits is as small as possible, to reduce impact on channel encoding performance.

After obtaining the CSI, the terminal adds the padding bit to the CSI when determining that the length of the CSI is less than the preset length, so that the length of the CSI obtained by adding the padding bit is the preset length. In this way, regardless of when a length of CSI to be actually reported by the terminal is any value less than the preset length, finally reported CSI can have the uniform preset length by adding the padding bit.

The network device is the receive end. After receiving the CSI, the network device decodes the CSI based on the preset length, a location of the padding bit, and a configuration condition such as a known configuration condition of the CSI. By obtaining the preset length, the network device does not need to attempt each possible CSI length. Therefore, a quantity of times of blind detection is reduced, and a decoding delay and decoding complexity are reduced.

Figure 6:
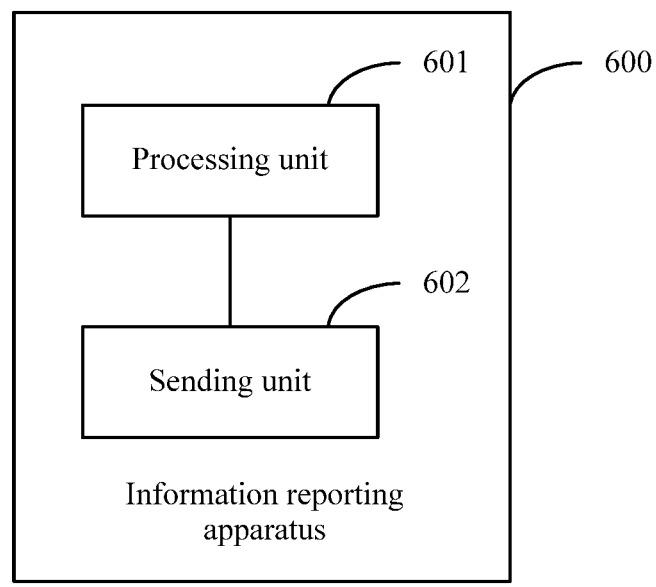
FIG. 6 is a block diagram of an information reporting apparatus according to an embodiment of this application.

Based on a same inventive concept as the foregoing method embodiment, as shown in FIG. 6, this application further provides an information reporting apparatus 600. The information reporting apparatus 600 is configured to perform the information reporting method provided in the foregoing method embodiment. Specifically, the information reporting apparatus 600 includes:

a processing unit 601, configured to determine whether a length of channel state information CSI is less than a preset length, where the processing unit 601 is further configured to add a padding bit to the CSI when determining that the length of the CSI is less than the preset length, where a length of CSI obtained by adding the padding bit is consistent with the preset length; and a sending unit 602, configured to send the CSI obtained by adding the padding bit.

Optionally, the processing unit 601 is further configured to: measure a wide band or a partial band, to obtain a first measurement result of the wide band or the partial band; and use the first measurement result as the CSI.

Optionally, the preset length is a value greater than or equal to 27. Alternatively, the processing unit 601 is further configured to determine the preset length based on a configuration condition of the CSI. The configuration condition of the CSI is a codebook type or a quantity of CSI-reference signal RS ports.

Optionally, if the configuration condition of the CSI is the quantity of CSI-RS ports, when the quantity of CSI-RS ports is 2, the preset length is 12; when the quantity of CSI-RS ports is 4, the preset length is 16; or when the quantity of CSI-RS ports is a value greater than 4, the preset length is 27.

Optionally, if the configuration condition of the CSI is the quantity of CSI-RS ports, when the quantity of CSI-RS ports is 2, the preset length is 10; when the quantity of CSI-RS ports is 4, the preset length is 16; or when the quantity of CSI-RS ports is a value greater than 4, the preset length is 27.

Optionally, if the configuration condition of the CSI is the quantity of CSI-RS ports, when the quantity of CSI-RS ports is 2 or 4, the preset length is 16; or when the quantity of CSI-RS ports is a value greater than 4, the preset length is 27.

If the configuration condition of the CSI is the codebook type, when the codebook type is type I-multipanel (TypeI-MultiPanel), the preset length is 25; or when the codebook type is type I-single panel (TypeI-SinglePanel), the preset length is 27.

The processing unit 601 is further configured to: measure a wide band and a subband, to obtain a second measurement result of the wide band and the subband, where the second measurement result includes a first part and a second part; and use the first part as the CSI.

The preset length is a value greater than or equal to 50. Alternatively, the processing unit 601 is further configured to determine the preset length based on a configuration condition of the CSI. A reporting type of the CSI is at least one of the following: a quantity of CSI-reference signal RS ports, a codebook type, and a quantity of subbands.

If the configuration condition of the CSI is the codebook type and the quantity of subbands, when the codebook type is type I-single panel TypeI-SinglePanel, and the quantity of subbands is L, the preset quantity is (10+2×L), where L is a positive integer, and 3<L<18. When the codebook type is TypeI-MultiPanel, and the quantity of subbands is L, the preset quantity is (9+2×L), where L is a positive integer, and 3<L<18. When the codebook type is TypeII, and the quantity of subbands is L, the preset quantity is (14+2×L), where L is a positive integer, and 3<L<18.

If the configuration condition of the CSI is the quantity of CSI-RS ports, when the quantity of CSI-RS ports is 4, the preset length is 48; or when the quantity of CSI-RS ports is a value greater than 4, the preset length is 50.

If the configuration condition of the CSI is the codebook type, when the codebook type is type I-multipanel (TypeI-MultiPanel), the preset length is 46. When the codebook type is type I-single panel (TypeI-SinglePanel), the preset length is 45. When the codebook type is type II TypeII, the preset length is 50, where TypeII includes Type II-port selection (PortSelection).

If the configuration condition of the CSI is the quantity L of subbands, the preset length is (14+2×L), where L is a positive integer, and 3<L<18.

If the configuration condition of the CSI is the quantity of CSI-RS ports and the quantity of subbands, when the quantity of CSI-RS ports is 4, and the quantity of subbands is L, the preset quantity is (12+2×L), where L is a positive integer, and 3<L<18. When the quantity of CSI-RS ports is a value greater than 4, and the quantity of subbands is L, the preset quantity is (14+2×L), where L is a positive integer, and 3<L<18.

The padding bit is located after all the indication information included in the CSI. Alternatively, the padding bit is located after a CSI-RS resource indicator CRI and a rank indication RI that are included in the CSI, and is located before indication information included in the CSI except the CRI or the RI.

The processing unit 601 is further configured to encode, in a polar code encoding manner, the CSI obtained by adding the padding bit.

The padding bit is located at a bit location with lowest reliability in the CSI obtained by adding the padding bit.

The processing unit 601 is further configured to send the CSI when determining that the length of the CSI is greater than or equal to the preset length.

Optionally, the padding bit is 0 or 1.

In conclusion, the information reporting apparatus 600 adds the padding bit to the length of the CSI based on the preset length, so that the length of the CSI obtained by adding the padding bit is equal to the preset length. In this way, regardless of when a length of CSI to be actually reported by the terminal is any value less than 25, finally reported CSI can have a uniform length of 25 by adding the padding bit. By obtaining the preset length, a network device does not need to attempt each possible CSI length. Therefore, a quantity of times of blind detection is reduced, and a decoding delay and decoding complexity are reduced.

Figure 7:
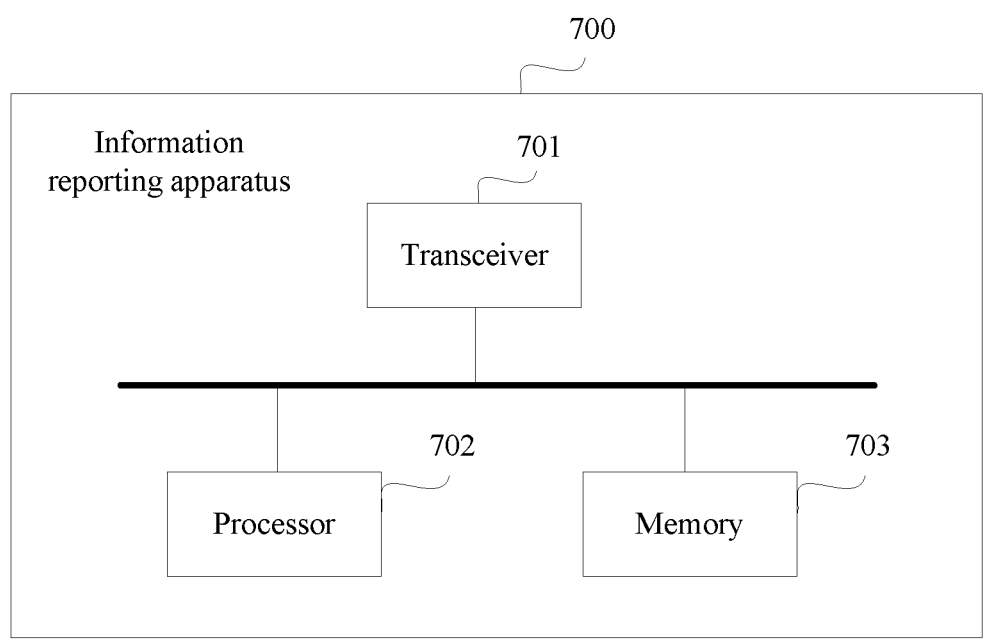
FIG. 7 is another block diagram of an information reporting apparatus according to an embodiment of this application.

Based on a same inventive concept as the foregoing method embodiment, as shown in FIG. 7, this application further provides an information reporting apparatus 700. The information reporting apparatus 700 is configured to perform the information reporting method provided in the foregoing method embodiment. Specifically, the information reporting apparatus 700 includes a transceiver 701, a processor 702, and a memory 703. The processor 702 is configured to invoke a group of programs. When the programs are executed, the processor 702 is enabled to perform the information reporting method provided in the foregoing embodiment. The memory 703 is configured to store the programs executed by the processor 702. In FIG. 6, the function module, namely, the processing unit 601, may be implemented by using the processor 702, and the function module, namely, the sending unit 602, may be implemented by using the transceiver 701.

The processor 702 may be a central processing unit (CPU), a network processor (NP), or a combination of a CPU and an NP.

The processor 702 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The memory 703 may include a volatile memory such as a random access memory (RAM). Alternatively, the memory 703 may include a nonvolatile memory such as a flash memory, a hard disk drive (HDD), or a solid state drive (SSD). Alternatively, the memory 703 may include a combination of the foregoing types of memories.

Optionally, the memory 703 may be a physically independent unit, or may be integrated with the processor 702.

Optionally, when some or all of the methods for adding a padding bit in the foregoing corresponding embodiment are implemented by using software, the information reporting apparatus 700 may alternatively include only the processor 702. The memory 703 configured to store the programs is located outside the information reporting apparatus 700. The processor 702 is connected to the memory 703 by using a circuit/wire, and is configured to read and execute the programs stored in the memory 703. In the information reporting method provided in the foregoing embodiment of this application, some or all of the operations and functions performed by the terminal may be completed by using a chip or an integrated circuit.

To implement functions of the apparatus described in FIG. 6 or FIG. 7, an embodiment of this application further provides a chip. The chip includes a processor, configured to support the apparatus in implementing the functions in the information reporting method provided in the foregoing embodiment. In a possible design, the chip is connected to a memory or the chip includes a memory, and the memory is configured to store a program instruction and data that are necessary for the apparatus.

An embodiment of this application provides a computer storage medium that stores a computer program. The computer program includes an instruction used to perform the information reporting method provided in the foregoing embodiment.

An embodiment of this application provides a computer program product including an instruction. When the instruction runs on a computer, the computer is enabled to perform the information reporting method provided in the foregoing embodiment.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a magnetic disk memory, a CD-ROM, and an optical memory) that include computer usable program code.

This application is described with reference to flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a special purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method for communicating channel state information (CSI), comprising:
    determining, by a communications apparatus, whether a total length of one or more indication information items to be included in the CSI is less than a preset length;
    based on a determination that the total length of the one or more indication information items to be included in the CSI is less than the preset length, adding, by the communications apparatus, one or more padding bits, to obtain a CSI bit sequence including the one or more indication information items and the one or more padding bits, wherein a total length of the CSI bit sequence is consistent with the preset length; and
    outputting, by the communications apparatus, the CSI bit sequence;
wherein the preset length is determined based on a quantity of CSI-reference signal (RS) ports, and
wherein the quantity of CRI-RS ports and the preset length have one or both of the following relationships:
    when the quantity of CSI-RS ports is 4, the preset length is 16; and
    when the quantity of CSI-RS ports is greater than 4, the preset length is 27.

2. The method according to claim 1, wherein an indication information item to be included in the CSI is one of the following:
    a channel quality indicator (CQI),
    a precoding matrix indicator (PMI),
    a rank indication (RI),
    a layer indicator (LI), or
    a CSI-reference signal resource indicator (CRI).

3. The method according to claim 2, wherein a maximum total length of the indication information items CQI, PMI, RI, LI and CRI is consistent with the preset length.

4. The method according to claim 3, wherein
    when the quantity of CSI-RS ports is 4 and the preset length is 16, a maximum length of the CRI is 3 bits, a maximum length of the RI is 2 bits, a maximum length of the LI is 1 bit, a maximum length of the PMI is 6 bits, and a maximum length of the CQI is 4 bits; and
    when the quantity of CSI-RS ports is greater than 4 and the preset length is 27, a maximum length of the CRI is 3 bits, a maximum length of the RI is 2 bits, a maximum length of the LI is 2 bits, a maximum length of the PMI is 16 bits, and a maximum length of the CQI is 4 bits.

5. The method according to claim 1, further comprising:
encoding, by the communications apparatus, the CSI bit sequence in a polar encoding process, wherein in the CSI bit sequence, the one or more padding bits are located at bit locations with lowest reliabilities.

6. The method according to claim 5, wherein the one or more padding bits are treated as frozen bits in the polar encoding process.

7. A communications apparatus, comprising:
a processor, couple to a memory which stores program instructions for execution by the processor, wherein by executing the program instructions, the apparatus is configured to:
determine whether a total length of one or more indication information items to be included in channel state information (CSI) is less than a preset length;
based on a determination that the total length of the one or more indication information items to be included in the CSI is less than the preset length, add one or more padding bits, to obtain a CSI bit sequence including the one or more indication information items and the one or more padding bits, wherein a total length of the CSI bit sequence is consistent with the preset length; and
output the CSI bit sequence;
wherein the preset length is determined based on a quantity of CSI-reference signal (RS) ports, and
wherein the quantity of CRI-RS ports and the preset length have one or both of the following relationships:
when the quantity of CSI-RS ports is 4, the preset length is 16; and
when the quantity of CSI-RS ports is greater than 4, the preset length is 27.

8. The communications apparatus according to claim 7, wherein an indication information item to be included in the CSI is one of the following:
a channel quality indicator (CQI),
a precoding matrix indicator (PMI),
a rank indication (RI),
a layer indicator (LI), or
a CSI-reference signal resource indicator (CRI).

9. The communications apparatus according to claim 8, a maximum total length of the indication information items CQI, PMI, RI, LI and CRI is consistent with the preset length.

10. The communications apparatus according to claim 8, wherein
when the quantity of CSI-RS ports is 4 and the preset length is 16, a maximum length of the CRI is 3 bits, a maximum length of the RI is 2 bits, a maximum length of the LI is 1 bits, a maximum length of the PMI is 6 bits, and a maximum length of the CQI is 4 bits; and
when the quantity of CSI-RS ports is a value greater than 4 and the preset length is 27, a maximum length of the CRI is 3 bits, a maximum length of the RI is 2 bits, a maximum length of the LI is 2 bits, a maximum length of the PMI is 16 bits, and a maximum length of the CQI is 4 bits.

11. The communications apparatus according to claim 7, wherein by executing the program instructions, the apparatus is further configured to:
encode the CSI bit sequence in a polar encoding process, wherein in the CSI bit sequence, the one or more padding bits are located at bit locations with lowest reliabilities.

12. The communications apparatus according to claim 11, wherein the one or more padding bits are treated as frozen bits in the polar encoding process.

13. The communications apparatus according to claim 7, wherein the memory is external to the communications apparatus.

14. The communications apparatus according to claim 7, wherein the communications apparatus is a microchip.

15. An apparatus, comprising one or more processing circuits, wherein the one or more processing circuits are configured to:
determine whether a total length of one or more indication information items to be included in channel state information (CSI) is less than a preset length;
based on a determination that the total length of the one or more indication information items to be included in the CSI is less than the preset length, add one or more padding bits, to obtain a CSI bit sequence including the one or more indication information items and the one or more padding bits, wherein a total length of the CSI bit sequence is consistent with the preset length; and
output the CSI bit sequence;
wherein the preset length is determined based on a quantity of CSI-reference signal (RS) ports; and
wherein the quantity of CRI-RS ports and the preset length have one or both of the following relationships:
when the quantity of CSI-RS ports is 4, the preset length is 16; and
when the quantity of CSI-RS ports is greater than 4, the preset length is 27.

16. The apparatus according to claim 15, wherein an indication information item to be included in the CSI is one of the following:
a channel quality indicator (CQI),
a precoding matrix indicator (PMI),
a rank indication (RI),
a layer indicator (LI), or
a CSI-reference signal resource indicator (CRI).

17. The apparatus according to claim 16, wherein a maximum total length of the indication information items CQI, PMI, RI, LI and CRI is consistent with the preset length.

18. The apparatus according to claim 17, wherein
when the quantity of CSI-RS ports is 4 and the preset length is 16, a maximum length of the CRI is 3 bits, a maximum length of the RI is 2 bits, a maximum length of the LI is 1 bits, a maximum length of the PMI is 6 bits, and a maximum length of the CQI is 4 bits; and
when the quantity of CSI-RS ports is a value greater than 4 and the preset length is 27, a maximum length of the CRI is 3 bits, a maximum length of the RI is 2 bits, a maximum length of the LI is 2 bits, a maximum length of the PMI is 16 bits, and a maximum length of the CQI is 4 bits.

19. The apparatus according to claim 16, wherein the one or more processing circuits are further configured to:
encode the CSI bit sequence in a polar encoding process, wherein in the CSI bit sequence, the one or more padding bits are located at bit locations with lowest reliabilities.

20. The apparatus according to claim 19, wherein the one or more padding bits are treated as frozen bits in the polar encoding process.

* * * * *